D. S. LEE.
DIRECTION INDICATOR FOR MOTOR VEHICLES.
APPLICATION FILED JULY 15, 1918.
1,299,966.
Patented Apr. 8, 1919.
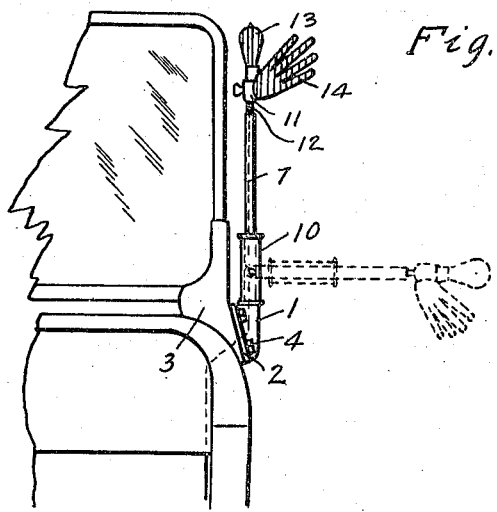
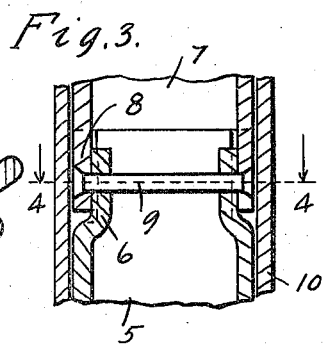
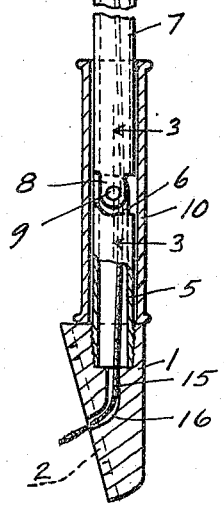
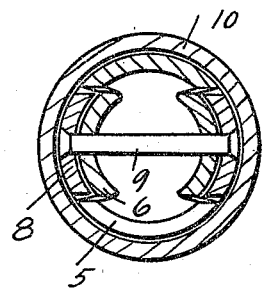
INVENTOR.
Datus S. Lee.
BY Hazard & Miller
ATTORNEY.

UNITED STATES PATENT OFFICE.

DATUS S. LEE, OF LOS ANGELES, CALIFORNIA.

DIRECTION-INDICATOR FOR MOTOR-VEHICLES.

1,299,966.  Specification of Letters Patent.  Patented Apr. 8, 1919.

Application filed July 15, 1918. Serial No. 245,038.

*To all whom it may concern:*

Be it known that I, DATUS S. LEE, a citizen of the United States, residing at Los Angeles, in the county of Los Angeles and State of California, have invented new and useful Improvements in Direction-Indicators for Motor-Vehicles, of which the following is a specification.

My invention relates to direction indicators and consists in the novel features herein shown, described and claimed.

Figure 1 is a rear elevation of a direction indicator embodying the principles of my invention in position for use upon the side of an automobile, parts of the automobile being broken away.

Fig. 2 is an enlarged sectional detail on a plane parallel with Fig. 1.

Fig. 3 is a fragmentary enlarged sectional detail on the line 3—3 of Fig. 2.

Fig. 4 is a cross-section on the line 4—4 of Fig. 3.

The socket 1 has attaching flanges 2 formed integral, and the flanges 2 are secured to the frame 3 of the windshield by cap screws 4. A section of pipe 5 is screwed into the socket 1. Ears 6 are formed upon the upper end of the pipe 5. A second section of pipe 7 has ears 8 formed upon its lower end, the ears 6 and 8 being connected by a hinge pin 9. The ears 6 and 8 and the hinge pin 9 are all within the plane of the peripheries of the pipe sections 5 and 7. A sleeve 10 is slidingly mounted upon the pipe sections 5 and 7 and adapted to rest upon the socket 1, so that when the sleeve is in its normal position the sleeve spans the joint and holds the pipe sections 5 and 7 in a straight vertical line, and so that when the sleeve 10 is manually elevated above the joint the pipe section 7 will swing outwardly to a horizontal position, as shown in dotted lines in Fig. 1.

The lamp socket 11 is fixed upon a pipe nipple 12 and the pipe nipple 12 screwed into the upper end of the pipe section 7. A lamp 13 is mounted in the lamp socket 11 and the indicator hand 14 is attached to the side of the lamp socket 11, the parts being assembled so that the hand points outwardly when in its upright position, as in full lines in Fig. 1, and points downwardly when in its horizontal position, as in dotted lines in Fig. 1. The electric wires 15 pass through an opening 16 in the socket 1 and through the pipe sections 5 and 7 and nipple 12 to the lamp socket 11. The wires 15 may be connected to any suitable source of electrical energy, such as a magneto or battery.

In the practical operation the parts are normally in an upright position, as shown in full lines in Fig. 1, and the sleeve 10 rests upon the socket 1 and covers the joint including the hinge pin 9. When it is desired to give a signal, the sleeve 10 is manually grasped and raised above the hinge pin 9 and the indicator is swung outwardly to a horizontal position, as shown in dotted lines in Fig. 1. When it is again desired to withdraw the signal, the sleeve 10 is manually operated, the indicator swung to a vertical position and the sleeve 10 falls upon the socket 1.

Various changes may be made in the details of construction without departing from the spirit of my invention as claimed.

I claim:

1. A direction indicator comprising a socket, means for attaching the socket to an automobile, a jointed arm extending upwardly from the socket, a sleeve mounted upon the jointed arm and adapted to cover the joint and hold the arm stiff in its vertical position and adapted to be elevated above the joint and allow the arm to swing outwardly to a horizontal position, and an indicating means carried by the upper end of the arm.

2. A direction indicator comprising a socket; means for attaching the socket to an automobile in a vertical position; a jointed arm extending upwardly from the socket; a sleeve mounted upon the jointed arm and adapted to cover the joint and rest upon the socket and hold the arm stiff in its vertical position, and adapted to serve as a handle and be elevated above the joint and allow the arm to swing outwardly to a horizontal position, and adapted to fall into position to cover the joint and rest upon the socket when the arm is swung to a vertical position; and an indicating means carried by the upper end of the jointed arm.

In testimony whereof I have signed my name to this specification.

DATUS S. LEE.

Copies of this patent may be obtained for five cents each, by addressing the "Commissioner of Patents, Washington, D. C."